(12) United States Patent
Yang et al.

(10) Patent No.: US 7,212,665 B2
(45) Date of Patent: May 1, 2007

(54) HUMAN POSE ESTIMATION WITH DATA DRIVEN BELIEF PROPAGATION

(75) Inventors: Ming-Hsuan Yang, Mountain View, CA (US); Gang Hua, Northwestern University, IL (US)

(73) Assignee: Honda Motor Co., Tokyo (JP)

( * ) Notice: Subject to any disclaimer, the term of this patent is extended or adjusted under 35 U.S.C. 154(b) by 0 days.

(21) Appl. No.: 11/266,830

(22) Filed: Nov. 3, 2005

(65) Prior Publication Data

US 2006/0098865 A1 May 11, 2006

Related U.S. Application Data

(60) Provisional application No. 60/625,437, filed on Nov. 5, 2004.

(51) Int. Cl.
*G06K 9/62* (2006.01)

(52) U.S. Cl. ...................................... 382/159
(58) Field of Classification Search ................ 382/103, 382/159, 226, 228, 203, 241; 700/47–49, 700/62
See application file for complete search history.

(56) References Cited

U.S. PATENT DOCUMENTS

| 2003/0103647 A1 | 6/2003 | Rui et al. |
| 2003/0208289 A1 | 11/2003 | Ben-Arie |
| 2005/0129278 A1 | 6/2005 | Rui et al. |
| 2005/0147278 A1 | 7/2005 | Rui et al. |
| 2005/0188013 A1 | 8/2005 | Rui et al. |
| 2005/0210103 A1 | 9/2005 | Rui et al. |
| 2005/0226471 A1 | 10/2005 | Singh et al. |

FOREIGN PATENT DOCUMENTS

WO   WO 2005/096216   10/2005

OTHER PUBLICATIONS

Black "inferring 3D people from 2D images", department of computer science, Brown University, pp. 1-72, Aug. 2003.*
Lin, et al "Capturing human hand motion in image sequences", IEEE, pp. 1-6, 2002.*
Moeslund, et al "Sequential monte carlo tracking of body parameters in a sub-space", IEEE, pp. 1-8, 2003.*
Sullivan, et al "Recognizing and tracking human action", European conference on computer vision, LNCS 2352, vol. 1, pp. 1-16.*
Barron, Carlos et al., "Estimating Anthropometry and Pose From a Single Uncalibrated Image," Computer Vision and Image Understanding, 2001, pp. 269-284, vol. 81.
Buades Rubio, Jose Maria et al., "A New Method for Detection and Initial Pose Estimation Based on Mumford-Shah Segmentation Functional," Universitat de les Illes Balears, 9 pages.

(Continued)

*Primary Examiner*—Daniel Miriam
(74) *Attorney, Agent, or Firm*—Fenwick & West LLP; Mark Duell

(57) ABSTRACT

A statistical formulation estimates two-dimensional human pose from single images. This is based on a Markov network and on inferring pose parameters from cues such as appearance, shape, edge, and color. A data-driven belief propagation Monte Carlo algorithm performs efficient Bayesian inferencing within a rigorous statistical framework. Experimental results demonstrate the effectiveness of the method in estimating human pose from single images.

21 Claims, 9 Drawing Sheets

OTHER PUBLICATIONS

Felzenszwalb, Pedro et al., "Efficient Matching of Pictorial Structures," 10 pages.

Freeman, William T., "Learning Low-Level Vision," Mitsubishi Electric Information Technology Center America, 2000, 43 pages, Cambridge, MA.

Hua, Gang et al., "Multi-Scale Visual Tracking by Sequential Belief Propagation," Proceedings of the IEEE Computer Society on Computer Vision and Patter Recognition (CVPR'04), 2004, 8 pages.

Ioffe, Sergey et al., "Finding People By Sampling," 1999, IEEE, pp. 1092-1097.

Isard, M., "Pampas: Real-Valued Graphical Models for Computer Vision," Microsoft Research, Mountain View, CA, 8 pages.

Jordan, Michael I., "Graphical Models: Probabilistic Inference," 17 pages.

Lee, Mun Wai et al., "Proposal Maps Driven MCMC for Estimating Human Body Pose in Static Images," IEEE Conference on Computer Vision and Pattern Recognition (CVPR'2004), Jun. 2004, 8 pages.

Mori, Greg et al., "Recovering Human Body Configurations: Combining Segmentation and Recognition," 8 pages.

Roth, Stefan et al., "Gibbs Likelihood for Bayesian Tracking," 8 pages.

Shakhnarovich, Gregory et al., "Fast Pose Estimation with Parameter Sensitive Hashing, AI Memo 2003-009," Apr. 2003, Massachusetts Institute of Technology, Cambridge, MA, 11 pages.

Sigal, Leonid et al., "Attractive People: Assembling Loose-Limbed Models Using Non-Parametric Belief Propagation," 8 pages.

Sidenbladh, Hedvig et al., "Learning the Statistics of People in Images and Video," International Journal of Computer Vision 54(1/2/3), 2003, pp. 183-209, Kluwer Academic Publishers, The Netherlands.

Sudderth, Erik B., "Nonparametric Belief Propagation," Proceedings of the 2003 IEEE Conference on Computer Vision and Pattern Recognition, Jun. 2003, pp. 605-612, vol. I.

Tipping, Michael E., "Probabilistic Principal Component Analysis," Microsoft Research, Sep. 27, 1999, 13 pages, Cambridge, UK.

Tu, Zhuowen et al., "Image Segmentation by Data-Driven Markov Chain Monte Carlo," IEEE Transactions On Pattern Analysis and Machine Intelligence, May 2002, pp. 657-673, vol. 24, No. 5.

Viola, Paul et al., "Rapid Object Detection Using A Boosted Cascade of Simple Features," Accepted Conference on Computer Vision and Pattern Recognition, 2001, 9 pages.

\* cited by examiner

200

|      |       | Head  | Torso | LUA   | LLA   | RUA     |
|------|-------|-------|-------|-------|-------|---------|
| RMSE |       | 14.32 | 18.96 | 14.62 | 11.85 | 19.52   |
|      | RLA   | LUL   | LLL   | RUL   | RLL   | Overall |
| RMSE | 19.01 | 23.75 | 18.19 | 20,48 | 18.98 | 17.96   |

HUMAN POSE ESTIMATION WITH DATA DRIVEN BELIEF PROPAGATION

CROSS REFERENCE TO RELATED APPLICATIONS

This application claims benefit under 35 USC § 119(e) to U.S. Provisional Patent Application No. 60/625,437, titled "Human Pose Estimation by Data Driven Belief Propagation," filed Nov. 5, 2004, which is incorporated by reference herein in its entirety.

FIELD OF THE INVENTION

The present invention generally relates to the field of computer vision, and more specifically, to estimating two-dimensional human pose from single images.

BACKGROUND OF THE INVENTION

Inferring human pose from a single image is an aspect of applications such as motion analysis and visual tracking, and is arguably one of the most difficult problems in computer vision. Recent approaches have yielded some favorable results. A description of this can be found in Efficient Matching of Pictorial Structures, P. Felzenszwalb and D. Huttenlocher, IEEE Conf. on Computer Vision and Pattern Recognition, volume 2, pages 2066–2073, 2000, and also in Proposal Maps Driven MCMC for Estimating Human Body Pose in Static Images, M. W. Lee and I. Cohen, Proc. IEEE Conf. on Computer Vision and Pattern Recognition, volume 2, pages 334–341, 2004, and also in Recovering Human Body Configurations: Combining Segmentation and Recognition, G. Mori, X. Ren, A. Efros, and J. Malik, Proc. IEEE Conf. on Computer Vision and Pattern Recognition, volume 2, pages 326–333, 2004, all of which are incorporated by reference herein in their entirety.

For convenience, these approaches may be categorized as deterministic and statistical. Deterministic methods apply deterministic optimization, and the objective function is the matching error between the model and the image data or between the image data and the exemplar set. Descriptions of these concepts can be found in Felzenszwalb and Huttenlocher, which was referenced above, and in Estimating Anthropometry and Pose From a Single Uncalibrated Image, C. Barrn and I. Kakadiaris, Computer Vision and Image Understanding, 81(3):269–284, 3 2001, and also in Fast Pose Estimation with Parameter-Sensitive Hashing, G. Shakhnarovich, P. Viola, and T. Darrell, Proc. IEEE International Conference on Computer Vision, volume 2, pages 750–757, 2003, both of which are incorporated by reference herein in their entirety. An alternative statistical approach builds detectors for different body parts and ranks the assembled configuration based on human-coded criteria. A description of this can be found in G. Mori, et al., which was referenced above.

Despite some success, many challenging issues remain in achieving robust and efficient pose estimation. First, an optimization problem of high dimensionality must be solved, and, consequently, the computation is intractable unless certain assumptions are explicitly made. Such assumptions may regard the background, characteristics of the human subjects, clothing, distance, etc., in order to make the application domain manageable by the proposed algorithms. Accordingly, the application domains have generally been limited to uncluttered backgrounds or to the human body with fixed scale. Descriptions of these concepts can be found in Barrn and Kakadiaris, Felzenszwalb and Huttenlocher, and Mori, et al., which were referenced above. Second, the set of exemplars must be sufficiently large to cover the parameter space necessary to achieve satisfactory estimation results. However, this also results in high computational complexity, as described in Shakhnarovich, which was referenced above. Third, it is difficult to build robust body part detectors except those for faces due to the large appearance variation caused by clothing. A description of this can be found in Rapid Object Detection Using a Boosted Cascade of Simple Features, P. Viola and M. Jones, Proc. IEEE Conf. on Computer Vision and Pattern Recognition, volume 1, pages 511–518, 2001, which is incorporated by reference herein in its entirety, and in Mori, et al., which was referenced above.

A merit of the statistical formulation for posture estimation is that prior knowledge of human body parts (e.g., appearance, shape, edge and color) can be exploited and integrated into a rigorous probabilistic framework for efficient inference. Ioffe and Forsyth proposed an algorithm that sequentially draws samples of body parts and makes the best prediction by matching the assembled configurations with image observations. A description of this can be found in Finding People by Sampling, Proc. IEEE International Conference on Computer Vision, pages 1092–1097, 1999, which in incorporated herein by reference in its entirety. However, this approach is best applied to estimating human pose in images without clothing or cluttered background, since the method relies solely on edge cues. Sigal et al. applied a non-parametric belief propagation algorithm for inferring the 3-D human pose as the first step of a human tracking algorithm. Background subtraction and images from multiple views facilitated human pose estimation and tracking. Descriptions of these concepts can be found in Attractive People: Assembling Loose-Limbed Models Using Nonparametric Belief Propagation, L. Sigal, M. Isard, B. Sigelman, and M. Black, Advances in Neural Information Processing System 16, MIT Press, 2004, and in PAMPAS: Real-Valued Graphical Models for Computer Vision, M. Isard, Proc. IEEE Conf. on Computer Vision and Pattern Recognition, pages 613–620, 2003, which are incorporated by reference herein in their entirety.

Lee and Cohen applied the Data Driven Markov Chain Monte Carlo (DDMCMC) algorithm to estimate 3-D human pose from single images, wherein the MCMC algorithm traversed the pose parameter space. However, it is unclear how the detailed balance condition and convergence within the Markov chain were ensured. Most importantly, the problem of inferring 3-D body pose from single two-dimensional (2-D) images is intrinsically ill-posed as a consequence of depth ambiguity. Descriptions of these concepts can be found in Lee and Cohen, which was referenced above, and in Image Segmentation by Data-Driven Markov Chain Monte Carlo, Z. Tu and S.-C. Zhu, IEEE Transaction on Pattern Analysis and Machine Intelligence, 24(5):657–673, 2002, which is incorporated by reference herein in its entirety.

Based on the above, there is a need for an improved system and method for inferring human pose from single images that manages complexity and eliminates the need for inordinate assumptions, and that provide reliable results.

SUMMARY OF THE INVENTION

A method of 2-D human pose estimation employs a probabilistic framework and an inference algorithm within a rigorous statistical framework. A human body pose is modeled by a Markov network, wherein the nodes denote body parts and the edges encode constraints among them. Each body part is represented within the Markov network by a state variable describing its shape and location. An efficient data-driven belief propagation Monte Carlo algorithm infers the 2-D human pose within a single target image. This algorithm incorporates importance sampling functions and is built from low-level visual cues.

From a set of labeled training images, a principal component analysis learns the 2-D shape models of each body part. These models provide prior knowledge for automatic prediction of body parts within a subsequently received target image. Data-driven importance sampling for the head pose is built using a computationally efficient AdaBoost-based face detector. A description of this can be found in Viola and Jones, which was referenced above.

Constrained by the head location determined from face detection, a probabilistic Hough transform extracts salient line segments in the image, which are assembled to form good candidates for constructing an importance sampling function for the human torso. A description of this can be found in A Probabilistic Hough Transform, N. Kiryati, Y. Eldar, and A. M. Bruckstein, Pattern Recognition, 24(4): 303–316, 1991, which is incorporated by reference herein in its entirety. A skin color model pertaining to the subject in the image is built based on the face detection result. This model is then utilized in sampling functions that predict candidate body parts such as arms and legs within the target image. The data driven importance functions for the body parts are incorporated in the belief propagation Monte Carlo framework for efficient Bayesian inference of the human pose. The observation models are built based on the steered edge response of the predicted body parts.

Diametric to the sequential DDMCMC algorithm, the method of the invention integrates reasoning mechanisms with visual cues. The method can also execute the inference tasks in parallel, and does so within a sound statistical framework. Furthermore, the shape models of body parts are explicitly learned using quadrangles rather than rectangular templates. This facilitates inference of pose parameters. A description of this can be found in Felzenszwalb and Huttenlocher, Ioffe and Forsyth, and in Mori, et al., which were referenced above.

Experimental results demonstrate the effectiveness of the method of the invention in estimating the pose of soccer players in single images with cluttered backgrounds.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 9($b$) illustrates image-specific skin color segmentation according to one embodiment of the present invention.

FIG. 9($c$) illustrates fitted lower-arm and upper-leg hypotheses according to one embodiment of the present invention.

FIG. 9($d$) illustrates upper-arm and lower-leg hypotheses according to one embodiment of the present invention.

FIG. 10($b$) illustrates line segments extracted according to one embodiment of the present invention.

FIG. 10($c$) illustrates torso hypotheses assembled from the line segments of FIG. 10($b$) according to one embodiment of the present invention.

FIG. 11($b$) illustrates likelihoods of translated lower-left leg hypotheses from the correct location according to one embodiment of the present invention.

DETAILED DESCRIPTION

Reference will now be made in detail to several embodiments of the present invention, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Architectural Overview

Figure 1:
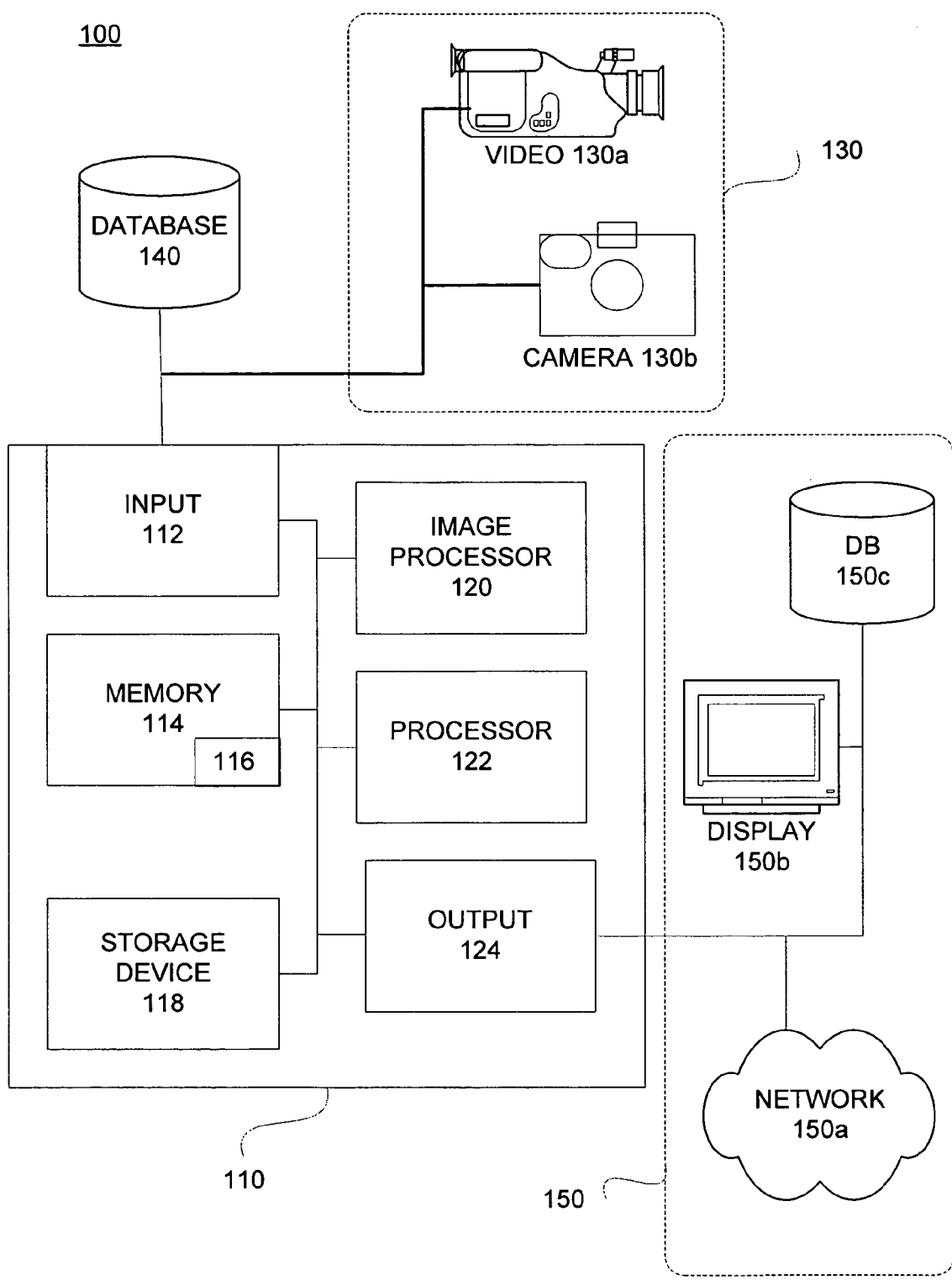
FIG. 1 illustrates a system according to one embodiment of the present invention.

FIG. 1 shows a system 100 according to one embodiment of the present invention. Computer system 110 comprises an input module 112, a memory device 114, a storage device 118, a processor 122, and an output module 124. In an alternative embodiment, an image processor 120 can be part of the main processor 122 or a dedicated device to perceive situations as digital images captured in a preferred image format. Similarly, memory device 114 may be a standalone memory device, (e.g., a random access memory (RAM) chip, flash memory, or the like), or a memory on-chip with processor 122 (e.g., cache memory). Storage device 118 may be any bulk storage device such as a hard disk, DVD-R/RW, CD-R/RW or RAM. Likewise, computer system 110 can be a stand-alone system, such as, a server, a personal computer, or the like. Alternatively, computer system 110 can be part of a larger system, for example, a robot having a vision system.

According to this embodiment, input module 112 receives digital images from a database 140. Input module 112 may also receive digital images directly from an imaging device 130, for example, a digital camera 130a (e.g., robotic eyes), a video system 130b (e.g., closed circuit television), an image scanner, or the like. Alternatively, input module 112 may be an interface to receive information from a network system, for example, another database, another vision system, Internet servers, or the like. The network interface may be a wired interface, such as, a USB, RS-232 serial port, Ethernet card, or the like, or may be a wireless interface module, such as, a wireless device configured to communicate using a wireless protocol, e.g., Bluetooth, WiFi, IEEE 802.11, or the like. Image processor 120 could be used to pre-process the digital images received through the input module 112 to convert the digital images to the preferred format on which the processor 122 operates.

Information is stored in the memory device 114 to be processed by processor 122. Processor 122 applies a set of instructions that when executed perform one or more of the methods according to the present invention, e.g., implementing a data-driven belief propagation Monte Carlo algorithm. Memory device 114 may, e.g., include a module of instructions 116 for implementing such a method.

Processor 122 may output information through the output module 124 to an external device 150, e.g., a network element or server 150a, a display device 150b, a database 150c or the like. As with input module 112, output module 124 can be wired or wireless. Output module 124 may be a storage drive interface, (e.g., hard-drive or optical drive driver), a network interface device (e.g., an Ethernet interface card, wireless network card, or the like), or a display driver (e.g., a graphics card, or the like), or any other such device for outputting the information determined. In addition, output module 124 may interface appropriately with the systems of an autonomous machine such as a humanoid robot.

Bayesian Formulation and Markov Network

Figure 2:
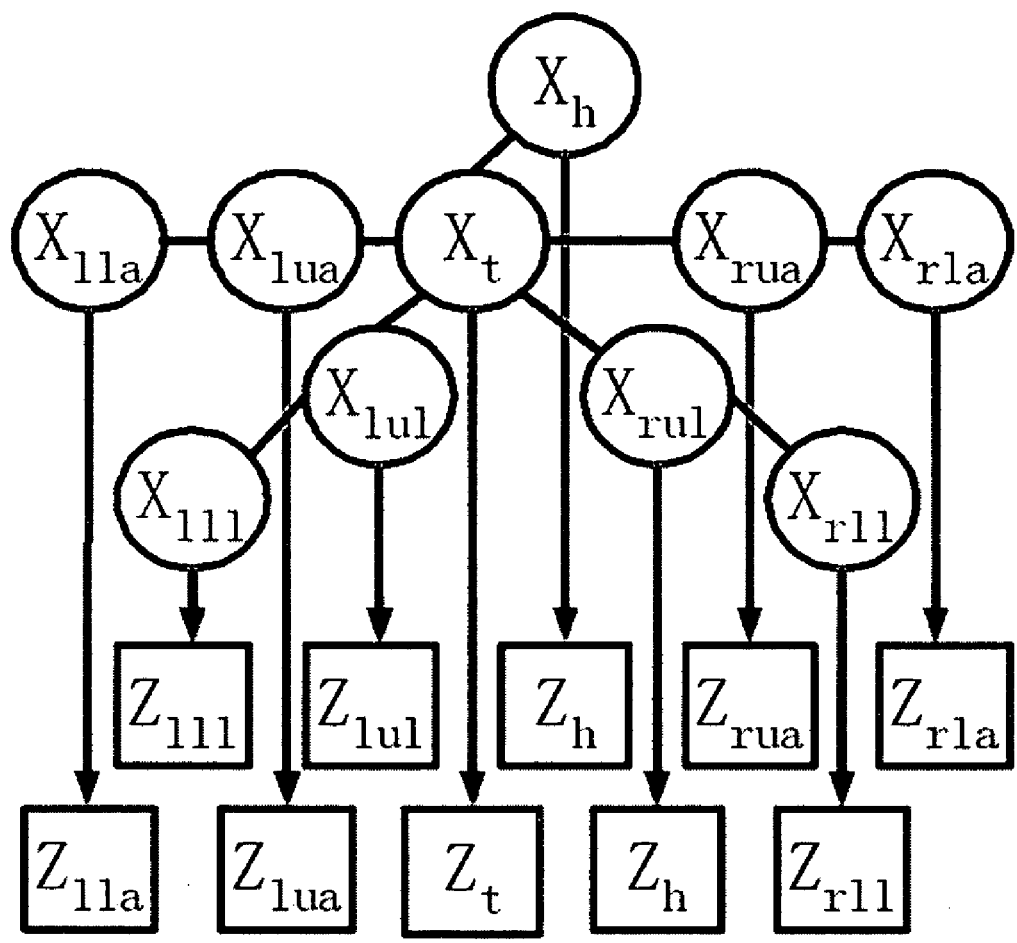
FIG. 2 illustrates a Markov network according to one embodiment of the present invention.

According to one embodiment, a human body configuration is represented by a Markov network as shown in FIG. 2. Each random variable $x_i$ represents the pose parameter (i.e., hidden state) of body part i, e.g., $x_h$ describes the pose of head, $x_t$ describes the pose of torso, and $x_{rul}$ describes the pose of the upper-right leg. Each undirected link models the constraints between adjacent body parts by a potential function $\psi_{ij}(x_i, x_j)$. Each directed link depicts the image observation $z_i$ of body part i with an observation likelihood function $\phi_i(z_i|x_i)$. The set of pose parameters X={$x_i$, i∈S} and the set of observations Z={$z_i$, i∈S}, respectively, where S is the set of all subscripts. The joint posterior distribution of this Markov network is $$P(X|Y) \propto \prod_{(i,j) \in E} \psi_{i,j}(x_i, x_j) \prod_{i \in \upsilon} \phi_i(z_i|x_i) \quad (1)$$

where E is the set of all undirected links and v is the set of all directed links. A description of this can be found in Jordan and Weiss, which was referenced above. Consequently, the pose estimation problem is formulated as a Bayesian inference problem of estimating the marginal posterior distribution $P(x_i|Z)$.

Direct computation of equation (1) is intractable, since doing so involves numerous integrations of real-valued random variables in every $P(x_i|Z)$. As an alternative, belief propagation algorithms offer an efficient solution to such inference problems. According to one embodiment, a Monte Carlo approach for belief propagation that is facilitated by local message passing (e.g., local computation) is applied. A description of this can be found in Multi-scale Visual Tracking by Sequential Belief Propagation, G. Hua and Y. Wu, Proc. IEEE Conf. on Computer Vision and Pattern Recognition, pages 826–833, 2004.

Pose Parameterization

Figure 3:
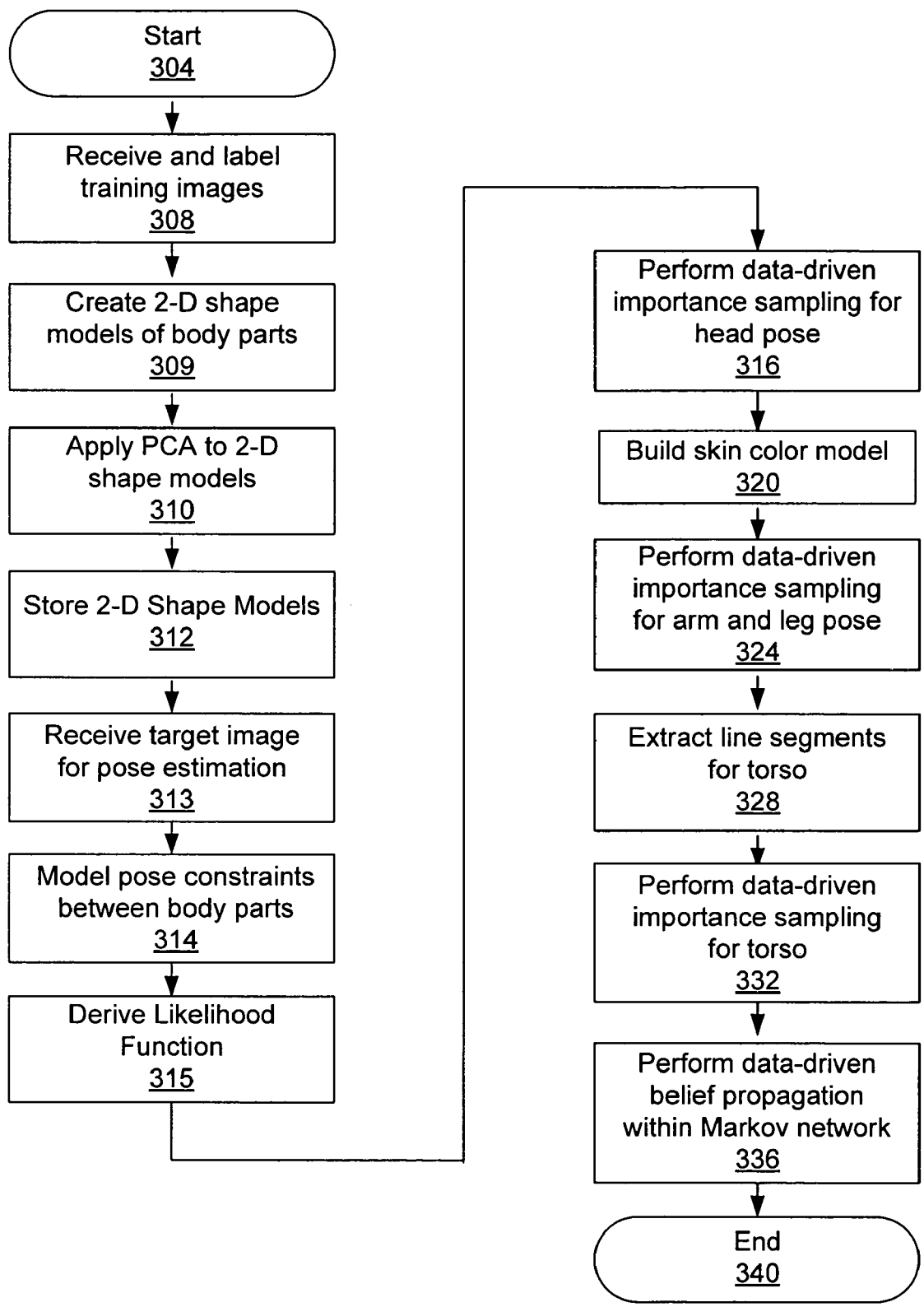
FIG. 3 illustrates a method of estimating human pose according to one embodiment of the present invention.
Figure 4:
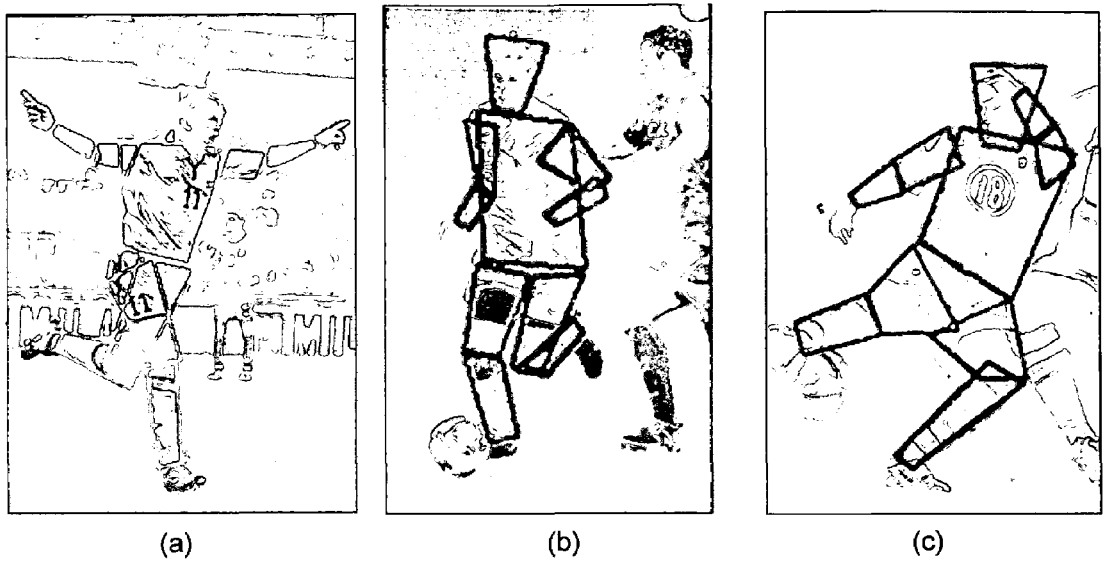
FIG. 4 illustrates several manually-labeled images according to one embodiment of the present invention.

Referring now to FIG. 3, a method 300 is shown for estimating human pose according to one embodiment of the present invention. One or more training images of human subjects are received, and the body parts are labeled 308. The images may be received, for example, by input device 112 from camera system 130 or database 140. The training images may be labeled manually or via automatic means. Multiple training images may be used, which may be unrelated, and may even portray different subjects. Each body part is labeled with a quadrangular shape in a manner similar to that used by Felzenszwalb and Huttenlocher, and by Mori, et al., which were referenced above. However, according to this embodiment, the body parts are not necessarily modeled by rectangles or trapezoids, since the body contours usually do not form parallel lines in the received images. Some example manually-labeled images are illustrated in FIG. 4.

Figure 5:
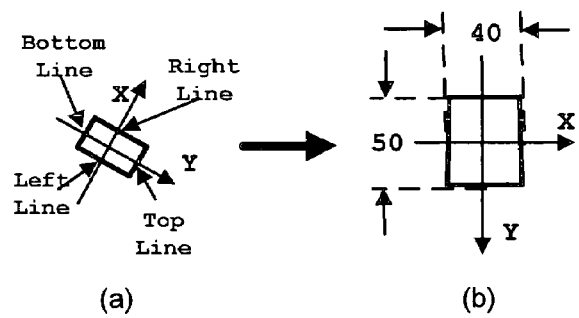
FIG. 5 illustrates normalization of a labeled shape according to one embodiment of the present invention.

The 2-D shape models of the body parts are next created 309. For each manually-labeled quadrangle, the lines along the body outer contour are defined as the left and the right lines, and the other two lines are defined as the top and the bottom lines. The local coordinate system of each body part is defined by choosing the centroid of the quadrangular shape as its origin. The Y-axis is oriented from the middle point of the top line to the middle point of the bottom line, and the X-axis is oriented perpendicular to the Y-axis, such that this local coordinate system represents a rotation and translation of the coordinate system of the overall image. Each labeled shape is then rotated with respect to a reference frame and then normalized in both the X and Y directions. For example, the width along the X axis between the left and the right lines is normalized to 40 pixels, and the height along the Y axis between the top and the bottom lines is normalized to 50 pixels, as depicted in FIG. 5. Each normalized shape is then represented by an 8-dimensional vector, by clockwise enumerating the coordinates of the four vertices. The normalized shapes may be stored in storage device 118 or database 150c.

Figure 6:
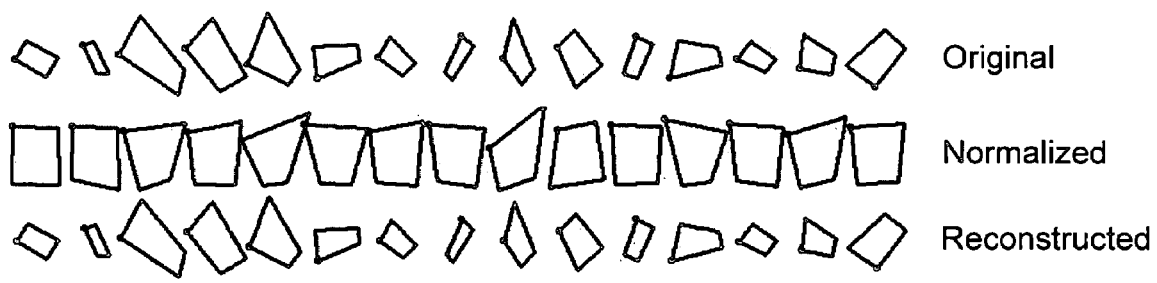
FIG. 6 illustrates original shapes, normalized shapes and reconstructed shapes of the upper right arm according to one embodiment of the present invention.

A probabilistic principle component analysis (PCA) is next applied 310 to each set of the 8-dimensional normalized body part shapes for dimensionality reduction. A description of this can be found in Probabilistic Principle Component Analysis, M. E. Tipping and C. M. Bishop, Journal of Royal Statistical Society, Series B, 61(3):611–622, 1999. The discussion below will describe how the learned shape model with probabilistic PCA is used to construct importance sampling functions for body parts. It has been experimentally found that 99% of the shape variation can be retained with the top 3 principal components. The shape representation with reduced dimensionality for each body part i∈S is denoted as $ps_i$. Consequently, the 2-D pose of body part i can be represented by the rotation $\theta$, scaling $s_x$, $s_y$, and translation $t_x$, $t_y$, in both X and Y directions of $ps_i$, e.g., $$x_i = \{ps_i, s_x, s_y, \theta, t_x, t_y\} \quad (2)$$

wherein $ps_i$ is referred to as the intrinsic pose parameter, and the other parameters are referred to as the extrinsic pose parameters. By learning a low-dimensional shape representation, the original 13-dimensional state space is reduced to 8 dimensions, thus facilitating efficient sampling. The low-dimensionality normalized shapes may also be stored 312 in storage device 118 or database 150c. FIG. 6 shows some example original labeled shapes for the upper-right-arm, the corresponding normalized shapes, as well as the corresponding reconstructed shapes from the probabilistic PCA. The reconstructed shapes clearly match the original labeled shapes well.

Potential Function and Likelihood Model

Figure 7:
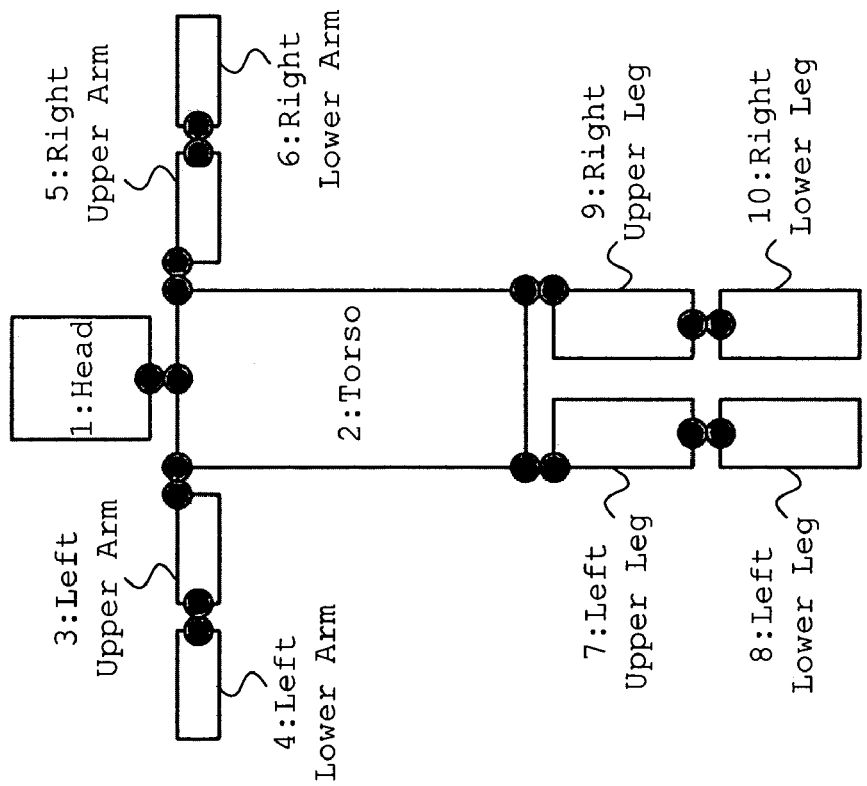
FIG. 7 illustrates link point pairs according to one embodiment of the present invention.

A target image is next received 313 for pose estimation. A potential function $\psi_j$ next models 314 the pose constraints between adjacent body parts. For pose estimation, the natural constraints entailing adjacent body parts should be of a loosely-connected nature. A description of this can be found in Sigal et al., which was referenced above. Accordingly, a Gaussian distribution models the Euclidean distance between the link points of adjacent body parts, e.g., $$\psi_{ij}(x_i, x_j) \propto \exp\left(-\frac{\|\tilde{P}t_{ij} - \tilde{P}t_{ji}\|^2}{2\sigma_{ij}^2}\right) \quad (3)$$

where $\|\cdot\|$ is the Euclidean distance, $\sigma^2_{ij}$ is the variance learned from the labeled images, $\tilde{P}t_{ij}$ is the link point of the $i^{th}$ to $j^{th}$ body part, and $\tilde{P}t_{ji}$ is the link point of the $j^{th}$ to $i^{th}$ body part. FIG. 7 shows all the link points of the body parts, wherein each pair of circle points represents the link point pair. According to this embodiment, the link points are either corner points or middle points of either the bottom or top line of the shape. For example, the link point of the left-upper-arm to the torso is defined as the corner point of the left line and the bottom line of the left-upper arm shape, and the link point of the torso to the left-upper arm is also defined as the corner point of the left-bottom corner of the torso shape. The link point of the upper-left arm to the lower-left arm is delineated by the middle point of the top line of the upper-left arm shape, and the link point of the left-lower-arm to the left-upper-arm is defined as the middle point of the bottom line of the left-lower-arm shape.

Although object appearance or texture has been successfully utilized in tasks such as face detection, body contour information may be the only salient cue available for pose estimation, as clothing causes large visual variation. According to this embodiment, the likelihood function $\phi_i$ is constructed based on the average steered edge response along the boundaries of the pose hypothesis of a body part. A description of this can be found in Learning the Statistics of People in Image and Video, H. Sidenbladh and M. Black, International Journal of Computer Vision, 54(1–3):183–209, 2003, which is incorporated by reference herein in its entirety. For example, if the rotation angle of one line segment l is $\alpha$ and the total number of points on the line is $N_l$, then the average steered edge response is $$\varepsilon_{l,\alpha} = \frac{1}{N_l \varepsilon_m} \sum_{(x_i, y_i) \in l} |\varepsilon_x(x_i, y_i)\sin\alpha - \varepsilon_y(x_i, y_i)\cos\alpha| \quad (4)$$

where $\epsilon_x$ and $\epsilon_y$ are the steered edge responses in the X and Y directions, and $\epsilon_m$ is the maximum value of the steered edge response. Unlike in Sidenbladh, the steered edge response is not computed according to different scales, because the average steered edge responses across scales may make the steered edge response less discriminant. Instead, the steered edge response is computed in each of the color component channels, e.g., red-green-blue (RGB). Thus, the edge responses in red, green and blue color channels for each hypothesized body part $x_i$ are $\epsilon_\alpha^{(R)}(x_i)$, $\epsilon_\alpha^{(G)}(x_i)$ and $\epsilon_\alpha^{(B)}(x_i)$, respectively. For head and torso, the average steered edge response is computed using all four line segments of the shape pose hypothesis, whereas the average steered edge response is only calculated on the left and right line segments for the other body parts. Since all the steered edge responses have been normalized between 0 and 1, the likelihood function is derived 315 based on the maximum steered edge response, e.g., $$\phi_i(z_i|x_i) = \max(\epsilon_\alpha^{(R)}(x_i), \epsilon_\alpha^{(G)}(x_i), \epsilon_\alpha^{(B)}(x_i)) \quad (5)$$

This embodiment uses the maximum steered edge response from different color channels based on the results of empirical studies. The studies revealed that more effective discrimination could be realized using the maximum rather than average edge response. A proposed Gibbs likelihood model was tried, but the performance was less satisfactory. A possible explanation is that background subtraction is utilized so that the body contours can be better extracted before learning a Gibbs model for likelihood estimation. A description of this can be found in Gibbs Likelihoods for Bayesian Tracking, S. Roth, L. Sigal, and M. Black, Proc. of IEEE Conference on Computer Vision and Pattern Recognition, volume 1, pages 886–893, 2004. Nevertheless, background subtraction is inapplicable in this embodiment, since human pose is to be estimated from single images.

Data-Driven Belief Propagation

According to one embodiment, a data-driven belief propagation Monte Carlo algorithm (DDBPMC) performs Bayesian inferencing according to a real-valued graphical model. Belief propagation is an efficient algorithm to compute the marginal posterior distribution $P(x_i|Z)$, through a local message passing process, whereby the message from $x_j$ to $x_i$ is computed by:

$$m_{ij}(x_i) \leftarrow \int_{x_j} \phi_j(z_j|x_j)\psi_{ij}(x_i, x_j) \prod_{k \in N(x_j)\setminus i} m_{jk}(x_j), \quad (6)$$

where $N(x_j)\setminus i$ is the set of neighboring nodes of $x_j$ except $x_i$. A description of this can be found in Graphical models:

Probabilistic Inference, M. Jordan and Y. Weiss, The Handbook of Brain Theory and Neural Network, pages 243–266. MIT Press, second edition, 2002, and in Learning Low-level Vision, W. T. Freeman and E. C. Pasztor, Proc. IEEE International Conference on Computer Vision, pages 1182–1189, 1999, both of which are incorporated by reference herein in their entirety.

According to one embodiment, the belief propagation algorithm iteratively updates the messages passed among the connected nodes until it converges, and the marginal posterior distribution $P(x_i|Z)$ on node $x_i$ can be efficiently computed by $$P(x_i|Z) \propto \phi_i(z_i|x_i) \prod_{j \in N(x_i)} m_{ij}(x_i) \qquad (7)$$

When both the potential function $\psi_{ij}(x_i, x_j)$ and the observation likelihood $\phi_i(z_i|x_i)$ are Gaussian distributions, equation (6) can be evaluated analytically and thus equation (7) can be analytically computed. However, situations arise where the observation likelihood functions $\phi_i(z_i|x_i)$ can only be modeled with non-Gaussian distributions. In such cases, the messages $m_{ij}(x_i)$ are also non-Gaussians, thereby making the computation intractable.

According to one embodiment, to resolve this problem and improve flexibility, a Monte Carlo approximation may be applied within the belief propagation formulation, resulting in a belief propagation Monte Carlo (BPMC) algorithm. Both the message $m_{ij}(x_i)$ and the marginal posterior distribution $P(x_i|Z)$ may be represented as weighted sample sets by $$m_{ij}(x_i) \sim \{s_i^{(n)}, \omega_i^{(j,n)}\}_{n=1}^N, j \in N(x_i) \qquad (8)$$

$$P(x_i|Z) \sim \{s_i^{(n)}, \pi_i^{(n)}\}_{n=1}^N \qquad (9)$$

Figure 8:
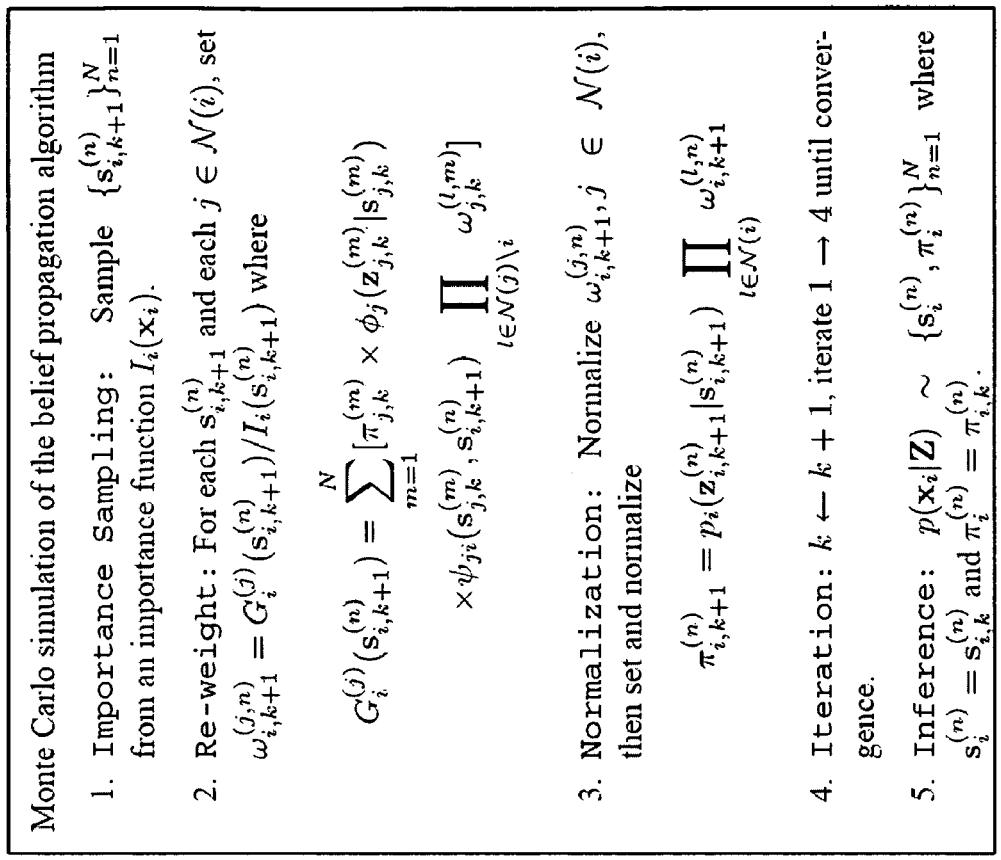
FIG. 8 illustrates a belief propagation Monte Carlo algorithm according to one embodiment of the present invention.

In these equations, s and $\pi$ respectively denote the samples drawn and the associated weights. That is, these samples are used to approximate the distribution $P(x_i|Z)$. The iterative computation for the belief propagation may be implemented based on these weighted sample sets as summarized in FIG. 8.

In both the non-parametric belief propagation and PAMPAS algorithms, the messages as well as the marginal distributions are modeled with Gaussian mixtures, and the message passing process is carried out by a Markov chain Monte Carlo (MCMC) algorithm. Descriptions of these concepts can be found in Nonparametric Belief Propagation, E. Sudderth, A. Ihler, W. Freeman, and A. Willsky, Proc. IEEE Conf. on Computer Vision and Pattern Recognition, pages 605–612, 2003, and in PAMPAS: Real-Valued Graphical Models for Computer Vision, M. Isard, Proc. IEEE Conf on Computer Vision and Pattern Recognition, pages 613–620, 2003, both of which are incorporated by reference herein in their entirety. In contrast, the BPMC algorithm models both the messages and marginal distributions with weighted samples, and the message passing process may be computed efficiently based on the samples drawn from an importance sampling. In the BPMC algorithm, good importance functions lead to efficient computation and better inference results. It will be shown below how good importance functions for drawing samples of body parts using visual cues are constructed. These concepts will be illustrated by application to estimating the pose of soccer players in images, wherein certain image cues can be exploited for computational efficiency.

Importance Function for Head Pose

Figures 9, 10:
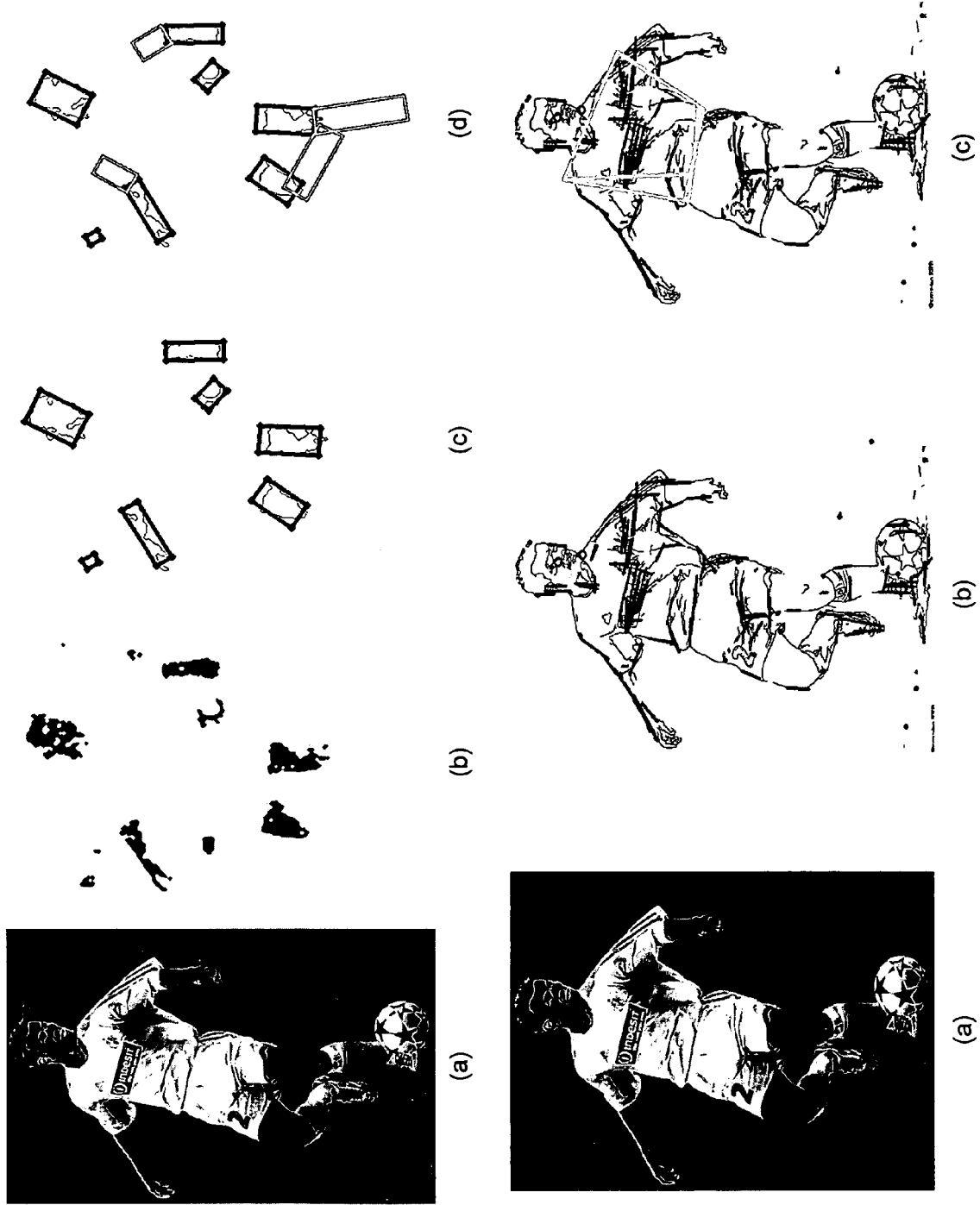
FIG. 9($a$) illustrates a face detected by an AdaBoost face detector according to one embodiment of the present invention.
FIG. 10($a$) illustrates an original image.

The AdaBoost-based face detector has demonstrated success in efficiently detecting faces in images of humans. A description of this can be found in Viola and Jones, which was referenced above. However, this view-based detector performs best in detecting faces in upright frontal views, although this limitation can be alleviated by utilizing a multi-view extension. FIG. 9(a) shows an example face detected by the AdaBoost-based detector.

A common problem with this face detector is that the raw detection results are not very accurate. For example, the bounding rectangles often enclose background pixels and do not enclose the faces with the correct pose. Since skin color pixels occupy the majority of a rectangular area enclosing a face, according to one embodiment, a k-means algorithm (k=2) is applied to group the pixels within the rectangle into skin and non-skin clusters. The center of the face rectangle is then repositioned to the centroid of the cluster of skin color pixels. The rectangular shape is then projected onto the learned PCA subspace of the head shape, thereby obtaining its intrinsic pose parameters as defined in equation (2). An approximated head pose $Ix_h$ is obtained, along with the extrinsic rotation, scaling and translation parameters extracted from the face rectangle. Thereby, the importance sampling function for the head pose is obtained 316:

$$I_h(x_h) \sim N(x_h|Ix_h, \Sigma_h) \qquad (10)$$

where $Ix_h$ is the identity matrix of $x_h$ and $\Sigma_h$ is a diagonal covariance matrix.

Importance Functions for Arm and Leg Pose

Soccer players often wear short sleeve shirts and short trunks, and consequently skin color is a salient cue for locating lower-arm and upper-leg regions. According to one embodiment, a skin color model is next constructed 320 from the pixels of the skin color cluster obtained as discussed above. A 2-D color histogram is computed from the normalized RGB pixel values of the skin color cluster. Although it is difficult and time consuming to develop a generic skin color model to account for all variations (e.g., resulting from lighting and race factors), it is relatively easy and effective to construct a skin color model specific to a human subject considered for pose estimation, and consequently skin color regions can be extracted effectively with thresholds. FIG. 9(b) shows some segmentation results using the learned skin color histogram, and FIG. 9(c) shows the resulting best-fit quadrangles after discarding small "blobs." It should be noted that the number of skin tone blobs do not necessarily match the number of body parts.

Geometric cues such as shape, size, position, and orientation with respect to the head position of a human can be exploited to generate good pose hypotheses for the lower-arm and upper-leg body parts from these best-fit rectangles. The hypotheses for the upper-arm and the lower-leg are then generated by first rotating the shape with respect to the link point of the corresponding lower-arm and the upper-leg hypotheses, respectively. The image likelihoods are then evaluated based on edge response using equations (4) and (5) for each rotation angle. The hypotheses with maximum likelihoods for upper-arm and lower-leg parts are selected for importance functions. FIG. 9(d) shows one hypothesis for each of the upper-arm and lower-leg. The importance sampling function for the arm and leg pose is modeled 324 by a Gaussian mixture of these hypotheses. That is, after obtaining K good pose hypothesis $Ix_i^{(n)}$, n=1, . . . , K for body part i, samples are drawn from the importance function $$I_i(x_i) \sim \sum_{n=1}^{K} \frac{1}{K} \mathcal{N}\left(x_i | Ix_i^{(n)}, \sum_i\right), i \in S \setminus \{h, t\} \quad (11)$$

where $\Sigma_i$ is a diagonal covariance matrix. Note that a small number of K good hypotheses facilitate efficient sampling and inference processes, although there may be adverse effects if the number is too small. The optimum value of K depends on the application. According to one embodiment, a value of K of 8 is used.

Importance Functions for Torso Pose

Locating the torso region may be the most important task in human pose estimation, since it connects to most other body parts. However, detecting a torso is difficult, as it is usually clothed, and therefore exhibits a large variation in appearance. Also, the torso usually lacks salient image cues, e.g., color and texture, to facilitate the detection process. According to one embodiment, line segments are extracted 328 from a probabilistic Hough transform and used to assemble good shape hypotheses for the torso. A description of this can be found in Kiryati and Eldar, which was referenced above.

A Canny edge detector is first applied to build an edge map, and then a probabilistic Hough transform is performed to detect the substantially horizontal and substantially vertical line segments. For each combination of a pair of vertical line segments, $l_{v1}$, $l_{v2}$, and a pair of horizontal line segments, $l_{h1}$, $l_{h2}$, let the corner points of the assembled shape be $p_{v1,h1}$, $p_{v1,h2}$, $p_{v2,h1}$, and $p_{v2,h2}$ respectively. Torso hypotheses are obtained by solving an optimization problem with an objective function specified by the following criteria:

1. The normalized shape of a good torso hypothesis should be reconstructed by the learned PCA subspace of the torso with minimum error, 2. A good hypothesized torso should be as close to the detected face as possible, and 3. The two vertical lines, $l_{v1}$, $l_{v2}$ should be as symmetric as possible in the assembled shape, subject to the constraints that $p_{v1,h1}$, $p_{v1,h2}$, $p_{v2,h1}$, and $p_{v2,h2}$ are within the range of image.

For each of the M torso hypotheses $Ix_t^{(n)}$ obtained by solving the above-mentioned optimization problem, with n=1, . . . , M and usually M<10, the response of edges extracted by the Canny detector with likelihood $\beta_t^{(n)}$ is computed using functions similar to equations (4) and (5). The importance sampling function for the torso pose is specified 332 by a Gaussian mixture, e.g., $$I_t(x_t) \sim \sum_{n=1}^{M} \beta_t^{(n)} \mathcal{N}\left(x_t | Ix_t^{(n)}, \sum_t\right) \quad (12)$$

where $\Sigma_t$ is the diagonal covariance matrix. FIG. 10(a) repeats the soccer player of FIG. 9(a). FIG. 10(b) shows one example of the detected substantially horizontal and substantially vertical line segments from the probabilistic Hough transform, and FIG. 10(c) shows the corresponding torso hypotheses. Although the number of combinations using horizontal and vertical lines is large, solving the above-mentioned optimization problem significantly prunes the number of torso hypotheses, e.g., M<10, thereby facilitating efficient and effective inference.

According to one embodiment, the data-driven importance functions for the body parts are next incorporated into the belief propagation Monte Carlo framework of FIG. 1, as described above. Equation (1) is solved by performing 336 belief propagation, e.g., local message passing, as summarized by FIG. 8. This may be accomplished via local computation, for example, using processor 122 and program 116.

Persons skilled in the art will appreciate that while a particular embodiment of the method of the invention has been described, other embodiments are possible. For example, data-driven importance sampling for the head pose, arm and leg pose, and torso (steps 316, 324 and 332 respectively) may be performed in parallel, rather than sequentially as described.

Experimental Results

Figure 11A:
FIG. 11($a$) illustrates horizontal translation of the lower-left leg with respect to the correct location according to one embodiment of the present invention.
Figure 11B:
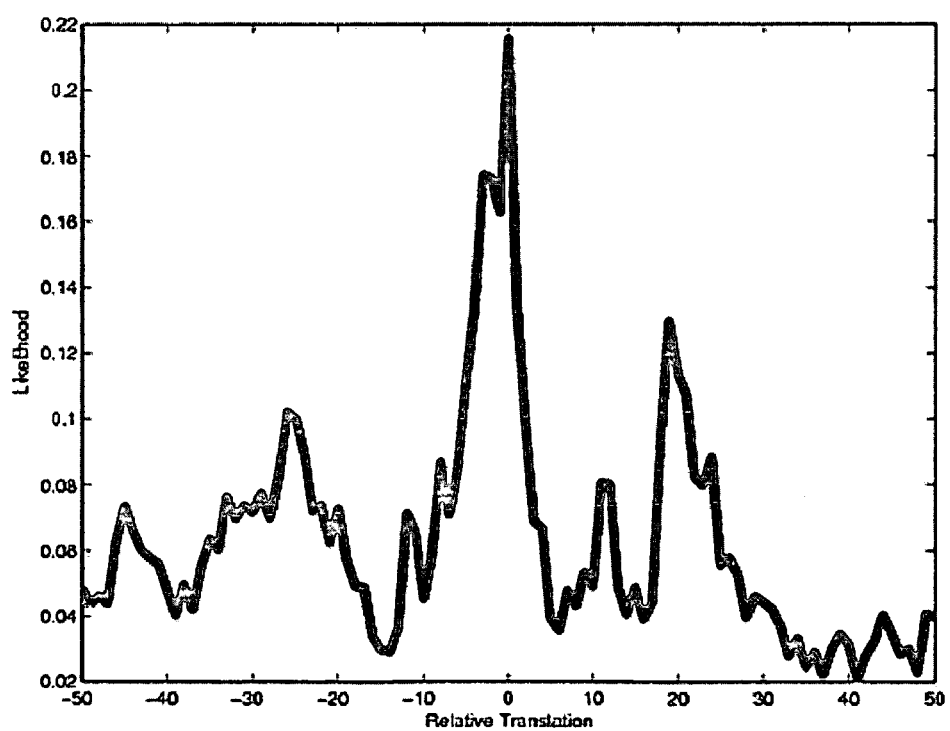

The method of the invention was applied to estimate pose in images of soccer players. Persons skilled in the art will appreciate that the method can be extended to estimate human pose in other image domains as well. To demonstrate the effectiveness of the likelihood function discussed above, a number of lower-left leg hypotheses were generated by translating the correctly labeled body part horizontally, as shown in FIG. 11(a). The corresponding likelihoods are shown in FIG. 11(b), wherein it is shown that the maximum likelihood occurs at the correct labeled location, i.e., 0 horizontal translation. The two next-smaller peaks correspond to the cases when one of the left and right lines of the shape pose is aligned with the boundary of the left-lower-leg in the image. The likelihood plots for the other body parts are similar to FIG. 11(b), except that the likelihood model for the torso may not peak at the correct labeled location and may have more local peaks (due to noisy edge response). This reflects the difficulty of constructing a likelihood model of the torso using only edge cues.

To learn the PCA subspace for each body part, a set of 50 training images of soccer players was collected, and the quadrangular shapes and poses of human body parts were manually labeled. For pose estimation experimentation, another set of 30 target images of soccer players was collected, and the body parts were first manually located to establish the "ground truth." These images represented humans with large variation in pose and background, as well as occlusions either due to clothing or view angles. The values of the diagonal covariance matrices in the importance functions of equations (10)–(12) were empirically learned from the training image set.

Figure 12:
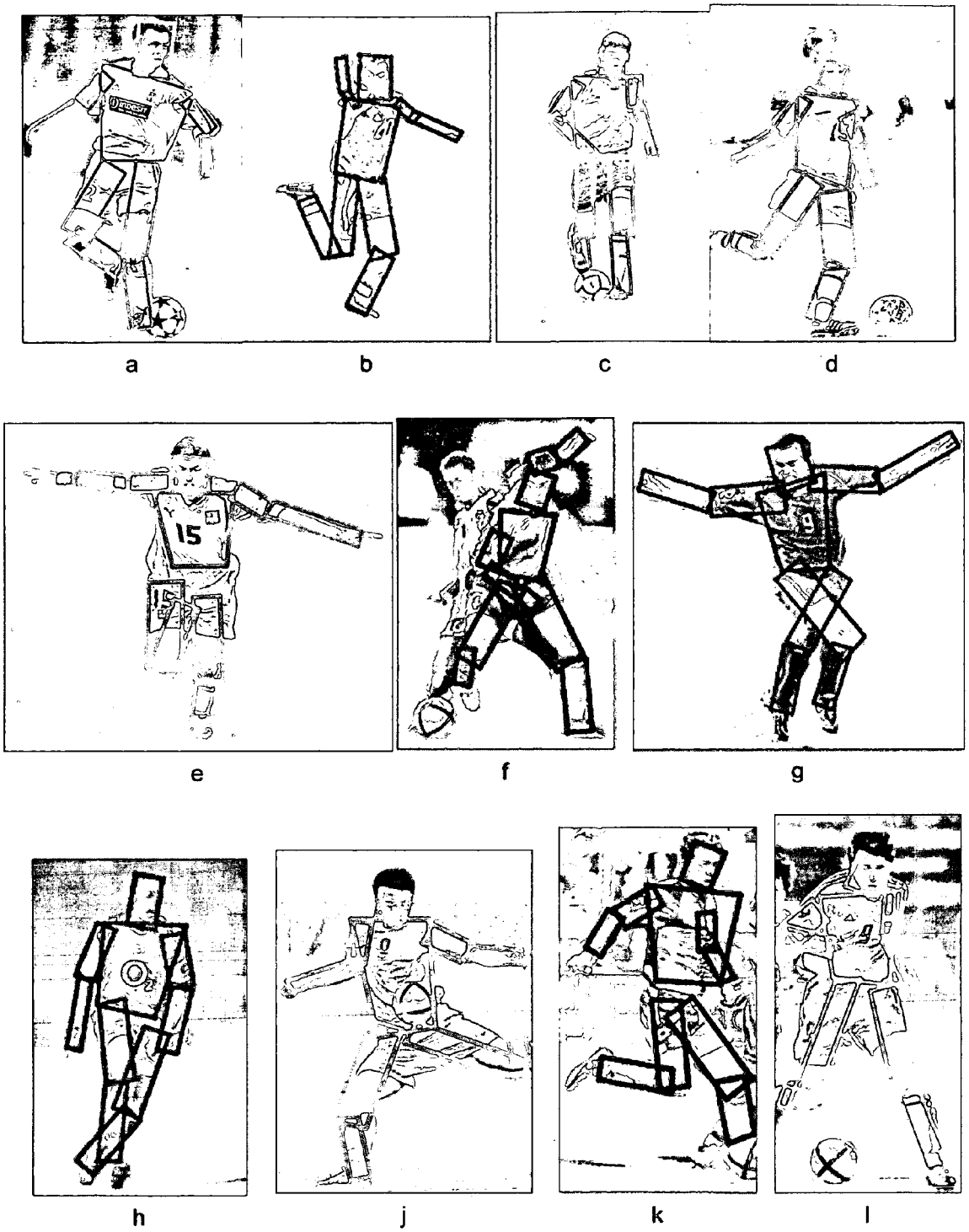
FIG. 12 illustrates experimental results of human pose estimation based on one embodiment of the present invention.

Empirical results of estimating pose in single target images according to one embodiment are illustrated in FIG. 12, wherein the best estimated shapes and locations of body parts are indicated by quadrangles. This embodiment draws 500 samples for each of the body parts, and the message passing process of the DDBPMC algorithm is iterated 6 times. The results show that the method of the invention is able to locate the body parts and estimate their pose well, even though they appear in the contexts of different posture, background, view angles and lighting conditions. The method is further able to infer poses which are heavily occluded, e.g., in FIG. 12(e)–(f), through the benefit of data driven importance sampling from visual cues. For example, the left lower leg of the player in FIG. 12(e) is located as a result of the best pose estimation, using image likelihoods and the importance function of equation (11). Similarly, the occluded body parts and their poses in FIGS. 12(g)–(h) are inferred using the proposed DDBPMC algorithm.

Figures 13, 14:
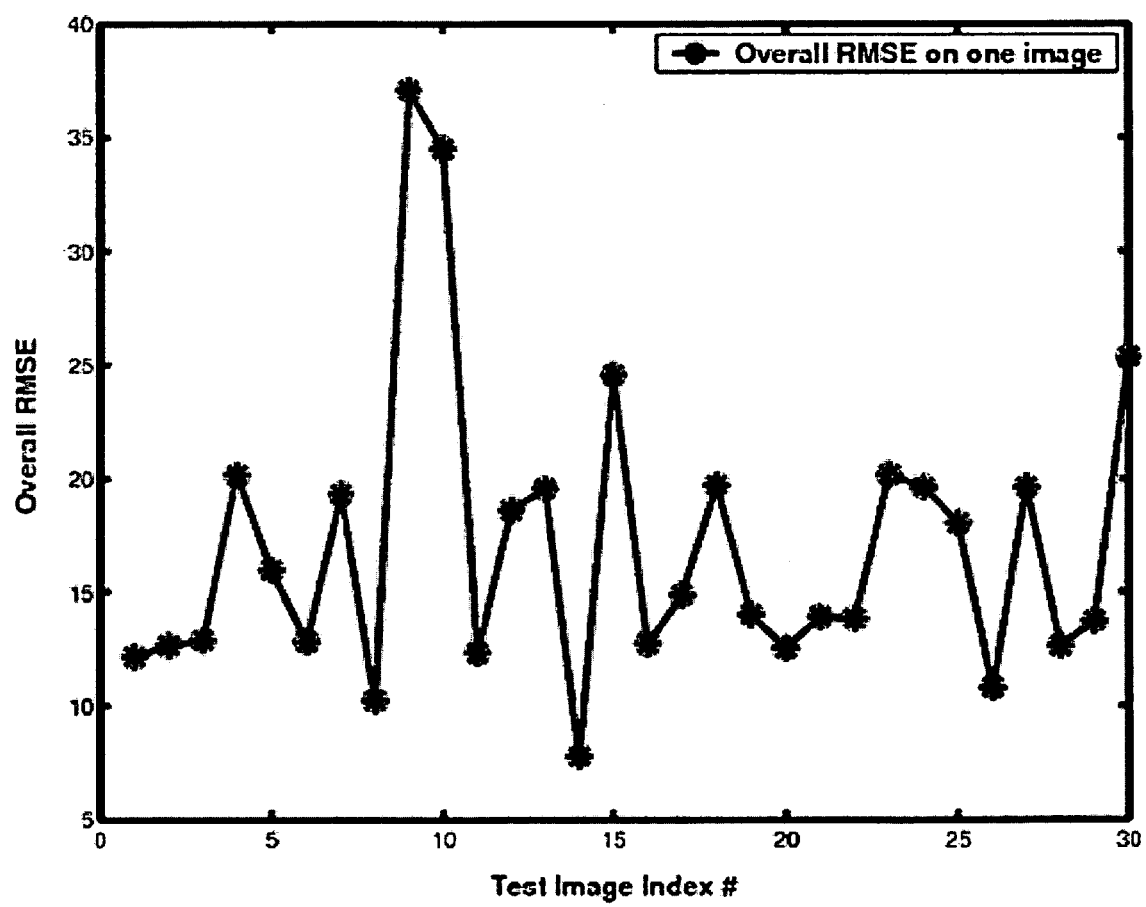
FIG. 13 illustrates the overall root-mean-square error associated with each of a set of test images according to one embodiment of the present invention.
FIG. 14 illustrates overall root mean square error associated with each of a set of test images.

The accuracy of pose estimation was evaluated by computing the root mean square errors (RMSE) between the estimated body pose enclosed by quadrangles and the ground truth based on the corner points of the pair of corresponding quadrangles. The average root of mean-square errors (RMSE) of each body part as well as that of the overall full body pose estimation over the 30 test images are presented in FIG. 13. For each test image, the RMSE was computed for all of the body parts. The RMSE of the body parts comprising all of the test images was then computed. Upon first comparison, it may seem that the RMSE of the method of the invention is larger than the result of 20 test images reported in Lee and Cohen, which was referenced above, even though the test sets are different. However, the present evaluation computes the accuracy of four points for each body part, while Lee and Cohen only evaluated the accuracy of the joint locations, and thus a direct RMSE comparison is not justified. Furthermore, the number of points in the points set of the present evaluation is greater than that in used by Lee and Cohen. Another complicating factor is the difficulty of determining what the "ground truth" of body pose is, as a result of covered clothing and subjective variation in labeling body parts and pose. Finally, the average RMSE of each image is presented in FIG. 14 to show the distribution of the overall RMSE among the 30 test images.

Advantages of the present invention include a system and method for estimating 2-D human pose from single target images. A Markov network and a data-driven Monte Carlo algorithm utilizing importance sampling functions provide efficient probabilistic inference. The method of the invention integrates reasoning mechanisms based on both overall body structure and on detailed characteristics of body parts. The algorithm can carry out inference tasks in parallel. Experimental results demonstrate the effectiveness of the method of the invention.

Persons skilled in the art will appreciate additional alternative designs for a system and method for estimating 2-D human pose from single images. Thus, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A method for estimating a pose of a human subject within a digital image, the method comprising:
   receiving one or more training digital images representing a plurality of human subjects, each human subject having at least one training body part;
   labeling each of said training body parts with a quadrangle;
   automatically creating a two-dimensional (2-D) shape model of each of said training body parts based on said quadrangles, each shape model having at least one associated link point identifying a point of attachment with a paired link point associated with an adjacent shape model;
   receiving a target digital image representing a target human subject having at least one target body part; and
   estimating a pose parameter of said target body part using said 2-D shape models, data driven importance sampling, a Markov network and a belief propagation Monte Carlo algorithm.

2. The method of claim 1, further comprising applying a principal component analysis to said 2-D shape models for dimensionality reduction.

3. The method of claim 1, further comprising storing said 2-D shape models.

4. The method of claim 1, wherein said belief propagation Monte Carlo algorithm is iterative and includes message passing based on importance samples.

5. The method of claim 1, wherein said belief propagation Monte Carlo algorithm includes performing local inference tasks in parallel based on the data driven importance sampling.

6. A method for estimating a pose of a human subject within a digital image, the method comprising:
   receiving one or more training digital images representing a plurality of human subjects, each human subject having at least one training body part;
   labeling each of said training body parts with a quadrangle;
   automatically creating a two-dimensional (2-D) shape model of each of said training body parts based on said quadrangles, each shape model having at least one associated link point identifying a point of attachment with a paired link point associated with an adjacent shape model;
   receiving a target digital image representing a target human subject having at least one target body part; and
   estimating a pose parameter of said target body part using said 2-D shape models, data driven importance sampling, a Markov network and a belief propagation Monte Carlo algorithm,
   wherein said Markov network comprises:
      a first set of nodes, each representing a pose parameter of one of a set of target body parts;
      a second set of nodes, each representing an observation of one of the set of target body parts;
      a set of undirected links, each connecting two of said first set of nodes and modeling a constraint between two adjacent body parts of the set of target body parts according to a first function; and
      a set of directed links, each directed from one of said first set of nodes to one of said second set of nodes and describing a likelihood of a corresponding observation according to a second function,
      wherein the second function is different than the first function.

7. The method of claim 6, wherein said belief propagation Monte Carlo algorithm is iterative and comprises message passing based on importance samples.

8. The method of claim 7, wherein said first function is $$\psi_{ij}(x_i, x_j) \propto \exp\left(-\frac{\|\tilde{P}t_{ij} - \tilde{P}t_{ji}\|^2}{2\sigma_{ij}^2}\right), \text{ wherein:}$$

$x_i$ and $x_j$ represent said two of said first set of nodes,
$\|\cdot\|$ is a Euclidean distance function,
exp is a natural exponential function,
$\sigma^2_{ij}$ is a variance learned from said labeled body parts,
$\tilde{P}t_{ij}$ is a link point of an $i^{th}$ to a $j^{th}$ body part, and
$\tilde{P}t_{ji}$ is a link point of a $j^{th}$ to an $i^{th}$ body part; and wherein said second function is $\phi_i(z_i|x_i)=\max(\epsilon_\alpha^{(R)}(x_i), \epsilon_\alpha^{(G)}(x_i), \epsilon_\alpha^{(B)}(x_i))$, wherein:

$x_i$ represents said one of said first set of nodes, $z_i$ represents said one of said second set of nodes, max (•) represents a maximum value function, and $\epsilon_\alpha^{(R)}(x_i)$, $\epsilon_\alpha^{(G)}(x_i)$ and $\epsilon_\alpha^{(B)}(x_i)$ represent a set of steered edge responses corresponding to a first, a second and a third color channel, respectively.

9. The method of claim 8, further comprising:

detecting a face region of said target human subject;

building a skin color model from said detected face region;

building an edge map of a torso region of said target human subject; and extracting a set of substantially horizontal and substantially vertical line segments from said edge map.

10. The method of claim 9, wherein said importance samples are drawn from importance functions corresponding to a head pose, an arm pose, a leg pose and a torso pose, wherein:

the head pose is derived using said face region;

the arm and leg poses are derived using said skin color model; and the torso pose is derived using said line segments.

11. The method of claim 10, wherein a joint posterior distribution of said Markov network is $$P(X|Y) \propto \prod_{(i,j)\in E} \psi_{i,j}(x_i, x_j)\prod_{i\in v} \phi_i(z_i|x_i),$$

wherein X represents the set of all $x_i$ and Z represents the set of all $z_i$.

12. The method of claim 6, wherein said belief propagation Monte Carlo algorithm includes performing local inference tasks in parallel based on the data driven importance sampling.

13. An apparatus for estimating a pose of a human subject within a digital image, the apparatus comprising:

an input module configured to:
receive one or more training digital images representing a plurality of human subjects, each human subject having at least one training body part, and
receive a target digital image representing a target human subject having at least one target body part; and a processor module configured to:
label each of said training body parts with a quadrangle,
automatically create a two-dimensional (2-D) shape model of each of said training body parts based on said quadrangles, each shape model having at least one associated link point identifying a point of attachment with a paired link point associated with an adjacent shape model, and
estimate a pose parameter of said target body part using said 2-D shape models, data driven importance sampling, a Markov network and a belief propagation Monte Carlo algorithm.

14. The apparatus of claim 13, wherein said belief propagation Monte Carlo algorithm is iterative and includes message passing based on importance samples.

15. The apparatus of claim 13, wherein said belief propagation Monte Carlo algorithm includes performing local inference tasks in parallel based on the data driven importance sampling.

16. An apparatus for estimating a pose of a human subject within a digital image, the apparatus comprising:

means for receiving one or more training digital images representing a plurality of human subjects, each human subject having at least one training body part;

means for labeling each of said training body parts with a quadrangle;

means for automatically creating a two-dimensional (2-D) shape model of each of said training body parts based on said quadrangles, each shape model having at least one associated link point identifying a point of attachment with a paired link point associated with an adjacent shape model;

means for receiving a target digital image representing a target human subject having at least one target body part; and means for estimating a pose parameter of said target body part using said 2-D shape models, data driven importance sampling, a Markov network and a belief propagation Monte Carlo algorithm.

17. The apparatus of claim 16, wherein said belief propagation Monte Carlo algorithm is iterative and includes message passing based on importance samples.

18. The apparatus of claim 16, wherein said belief propagation Monte Carlo algorithm includes performing local inference tasks in parallel based on the data driven importance sampling.

19. A computer program product, comprising a computer-readable medium having computer program instructions embodied thereon to cause a computer processor to implement a method for estimating a pose of a human subject within a digital image, the method comprising:

receiving one or more training digital images representing a plurality of human subjects, each human subject having at least one training body part;

labeling each of said training body parts with a quadrangle;

automatically creating a two-dimensional (2-D) shape model of each of said training body parts based on said quadrangles, each shape model having at least one associated link point identifying a point of attachment with a paired link point associated with an adjacent shape model;

receiving a target digital image representing a target human subject having at least one target body part; and estimating a pose parameter of said target body part using said 2-D shape models, data driven importance sampling, a Markov network and a belief propagation Monte Carlo algorithm.

20. The computer program product of claim 19, wherein said belief propagation Monte Carlo algorithm is iterative and includes message passing based on importance samples.

21. The computer program product of claim 19, wherein said belief propagation Monte Carlo algorithm includes performing local inference tasks in parallel based on the data driven importance sampling.

* * * * *

UNITED STATES PATENT AND TRADEMARK OFFICE
CERTIFICATE OF CORRECTION

| | |
|---|---|
| PATENT NO. | : 7,212,665 B2 |
| APPLICATION NO. | : 11/266830 |
| DATED | : May 1, 2007 |
| INVENTOR(S) | : Ming-Hsuan Yang and Gang Hua |

It is certified that error appears in the above-identified patent and that said Letters Patent is hereby corrected as shown below:

Column 14,
Line 67, (the last line of column 14) please delete:

" $\widetilde{Pt}_{J_t}$ is a link point of a $j^{th}$ to an $i^{th}$ body part; and"

and replace with

-- $\widetilde{Pt}_{J_i}$ is a link point of a $j^{th}$ to an $i^{th}$ body part; and--

Signed and Sealed this

Tenth Day of July, 2007

JON W. DUDAS
*Director of the United States Patent and Trademark Office*